United States Patent
Ikeda

(10) Patent No.: US 8,634,556 B2
(45) Date of Patent: Jan. 21, 2014

(54) COMMUNICATION APPARATUS AND CONTROL METHOD

(75) Inventor: Nobuhiro Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 820 days.

(21) Appl. No.: 12/349,245

(22) Filed: Jan. 6, 2009

(65) Prior Publication Data

US 2009/0175446 A1 Jul. 9, 2009

(30) Foreign Application Priority Data

Jan. 8, 2008 (JP) .................................. 2008-001645

(51) Int. Cl.
*H04K 1/00* (2006.01)
*G06F 15/173* (2006.01)

(52) U.S. Cl.
USPC ............... 380/255; 380/28; 380/29; 380/259; 380/270; 380/277; 709/217; 709/218; 709/219; 709/220; 709/223; 709/228; 726/2; 726/3; 726/4; 726/6; 726/12; 726/14; 726/27; 726/29; 713/160; 713/162; 713/166; 713/171; 713/182; 370/254; 370/255

(58) Field of Classification Search
USPC ......................... 380/255, 270; 726/3; 709/223
See application file for complete search history.

(56) References Cited

U.S. PATENT DOCUMENTS

| | | | |
|---|---|---|---|
| 7,269,260 B2 | 9/2007 | Adachi et al. | |
| 2002/0112181 A1* | 8/2002 | Smith ............................ | 713/201 |
| 2002/0199015 A1* | 12/2002 | Tari et al. ...................... | 709/238 |
| 2003/0120920 A1* | 6/2003 | Svensson ...................... | 713/168 |
| 2004/0158704 A1* | 8/2004 | Oates et al. ................... | 713/151 |
| 2004/0177248 A1* | 9/2004 | Yoshida ......................... | 713/155 |
| 2004/0228492 A1* | 11/2004 | Park ............................... | 380/277 |
| 2005/0033990 A1* | 2/2005 | Harvey et al. ................. | 713/201 |
| 2005/0132193 A1 | 6/2005 | Ishidoshiro et al. | |
| 2005/0135625 A1* | 6/2005 | Tanizawa et al. ............. | 380/270 |
| 2005/0180367 A1* | 8/2005 | Dooley et al. ................ | 370/338 |
| 2005/0188047 A1* | 8/2005 | Joy et al. ....................... | 709/207 |
| 2005/0226183 A1* | 10/2005 | Penumetsa .................... | 370/329 |
| 2005/0238172 A1 | 10/2005 | Tamura | |
| 2006/0164969 A1* | 7/2006 | Malik et al. ................... | 370/203 |
| 2007/0025486 A1* | 2/2007 | Gainey et al. ................. | 375/356 |
| 2007/0082654 A1* | 4/2007 | Hovnanian et al. ........... | 455/410 |
| 2007/0192833 A1* | 8/2007 | Ho et al. ........................ | 726/3 |
| 2008/0062925 A1* | 3/2008 | Mate et al. .................... | 370/331 |
| 2009/0007246 A1* | 1/2009 | Gutowski et al. ............. | 726/6 |
| 2009/0086672 A1* | 4/2009 | Gholmieh et al. ............ | 370/329 |
| 2009/0122201 A1* | 5/2009 | Freundlich et al. ........... | 348/725 |
| 2009/0129599 A1* | 5/2009 | Garcia et al. ................. | 380/279 |
| 2009/0135767 A1* | 5/2009 | Silk et al. ...................... | 370/329 |
| 2009/0154390 A1* | 6/2009 | King ............................. | 370/315 |
| 2009/0175447 A1* | 7/2009 | Adachi et al. ................. | 380/270 |
| 2010/0138505 A1* | 6/2010 | Joy et al. ....................... | 709/206 |
| 2011/0116432 A1* | 5/2011 | Doppler et al. ............... | 370/312 |

\* cited by examiner

*Primary Examiner* — Yin-Chen Shaw
*Assistant Examiner* — Jenise Jackson
(74) *Attorney, Agent, or Firm* — Cowan, Liebowitz & Latman, P.C.

(57) ABSTRACT

This invention allows connection of an apparatus with a low security level without lowering the security level of a network even when such apparatus issues a connection request. This invention is directed to an access point which makes wireless communications with a station using an encryption method (AES). Upon reception of a connection request message including information indicating an encryption method (WEP) that can be used by a station, the access point checks if the encryption method (WEP) recognized based on the received connection request message is different from the encryption method (AES). When it is determined that the two encryption methods are different, the access point launches a controller which makes wireless communications with the station using that encryption method (WEP).

9 Claims, 13 Drawing Sheets

COMMUNICATION APPARATUS AND CONTROL METHOD

BACKGROUND OF THE INVENTION

1. Field of the Invention

The present invention relates to a communication control technique for connecting communication apparatuses having different security levels to a network.

2. Description of the Related Art

In recent years, products compliant with the IEEE802.11 standard (IEEE Std 802.11-1999 (R2003)) as the wireless communication standard have prevailed, and wireless LANs using communication apparatuses are generally established. The connection mode between communication apparatuses in a wireless LAN can normally be roughly classified into the following two modes.

The first mode is an infrastructure mode which is configured by a plurality of stations (STA) and an access point (AP). The second mode is an ad-hoc mode which is configured by only a plurality of stations, and makes a direct communication between stations without the intervention of any access point.

When a wireless LAN is established via an access point, which serves as a relay, as in the infrastructure mode of these modes, attention needs to be paid to the security. This is because the wireless LAN may be hacked via the access point to leak communication data to a third parity.

For this reason, in the infrastructure mode, advanced security is required to be assured upon establishing the wireless LAN (e.g., to adopt an encryption method in data transmission).

As a typical encryption method, for example, WEP (Wired Equivalent Privacy) is available. As a further advanced encryption method, AES (Advanced Encryption Standard) or the like is available. These encryption methods are set by an administrator or user who manages the wireless LAN.

Recently, products which automatically implement a wireless parameter setup upon connection to the wireless LAN and a security level setup upon selection of encryption methods by pressing buttons arranged on an access point and stations have appeared.

As a standard for facilitating the wireless parameter setup and security level setup, the standard called WPS (Wi-Fi Protected Setup) is available.

However, when the wireless parameter setup and security level setup are allowed to be automatically attained, if the wireless LAN includes a communication apparatus with a low security level, the overall security level unwantedly lowers.

Or when a communication apparatus with a low security level (e.g., WEP) sends a connection request to a wireless LAN set with a high security level (e.g., AES), connection is rejected.

For this reason, it is demanded to facilitate the setups and to also connect a communication apparatus with a low security level to a network without lowering the security level of the whole network.

SUMMARY OF THE INVENTION

The present invention has been made in consideration of the above situation.

A communication apparatus according to the present invention comprises the following arrangement. That is, a communication apparatus comprises:

a confirmation unit configured to confirm an encryption method requested by a second communication apparatus that requests connection to the communication apparatus; and a formation unit configured to execute, when the encryption method which is requested by the second communication apparatus and is confirmed by the confirmation unit is a second encryption method different from a first encryption method used in a first network formed by the communication apparatus, processing for forming a second network using the second encryption method.

According to the present invention, an apparatus with a low security level can be connected to a network without lowering the security level of the whole network.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will now be described in detail in accordance with the accompanying drawings.

In the following description, assume that a communication apparatus is used as a concept including both an apparatus serving as an access point and an apparatus serving as a station. Furthermore, assume that communication apparatuses include an apparatus which has one or both of a function as an access point and a function as a station.

[First Embodiment]

<1. Configuration of Wireless LAN Before Stations With Low Security Level are Connected>

Figure 1:
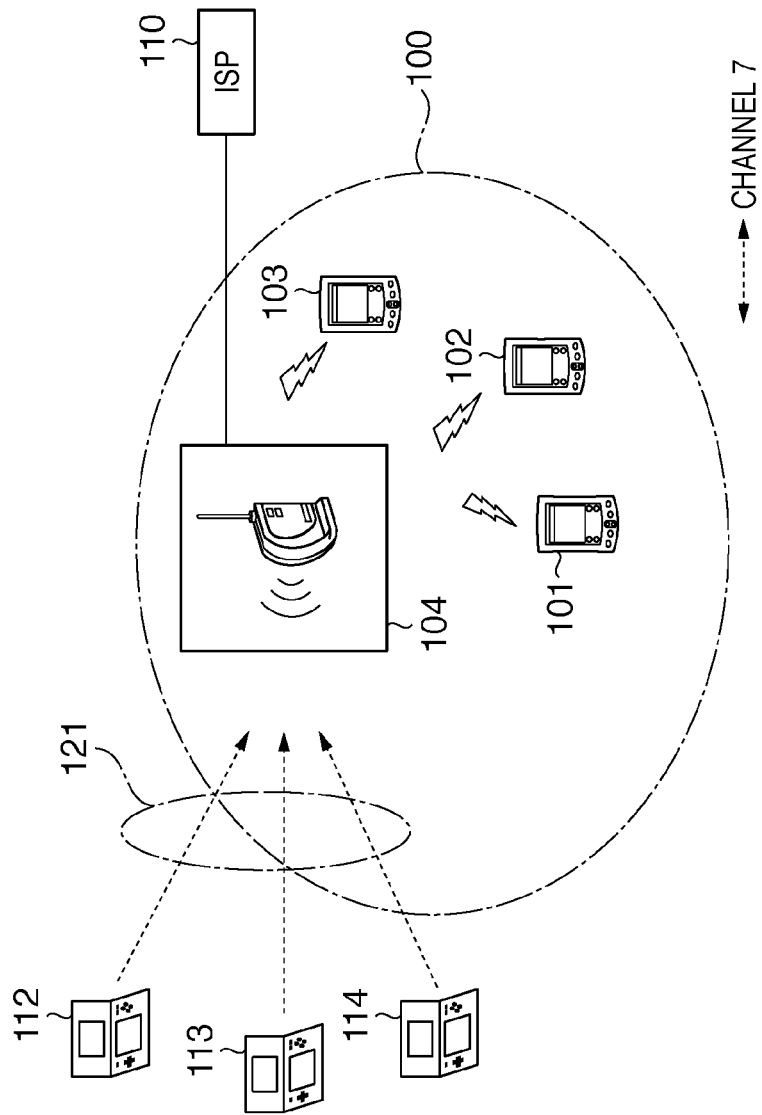
FIG. 1 is a view showing the configuration of a wireless LAN which includes an access point according to the first embodiment of the present invention.

FIG. 1 is a view showing the configuration of a wireless LAN which includes an access point according to the first embodiment of the present invention.

Referring to FIG. 1, reference numeral 100 denotes a wireless area of a wireless LAN formed by a communication apparatus which uses AES (first encryption method) as an encryption method; and 101 to 103, stations as second communication apparatuses which are associating with the wireless area 100.

Reference numeral 104 denotes an access point as a communication apparatus comprising a router function, in which a BSS (Basic Service Set) controller (first controller) for AES controls the stations 101 to 103 which are associating with the wireless area 100. Note that a BSS is a unit of a group generated by the access point, and the BSS controller for AES is a controller which controls the BSS (group) using AES.

Reference numeral 110 denotes an ISP (Internet Service Provider) to which the access point 104 is connected.

Reference numerals 112 to 114 denote stations as communication apparatuses which can use only WEP as an encryption method (stations which have a usable security level lower than the stations 101 to 103), and are not connected to the wireless LAN in FIG. 1.

Reference numeral 121 denotes probe request messages transmitted from the stations 112 to 114 for the purpose of connection to the wireless LAN.

<2. Sequence of Overall Processing Until Stations With Low Security Level are Connected to Wireless LAN>

Figure 2:
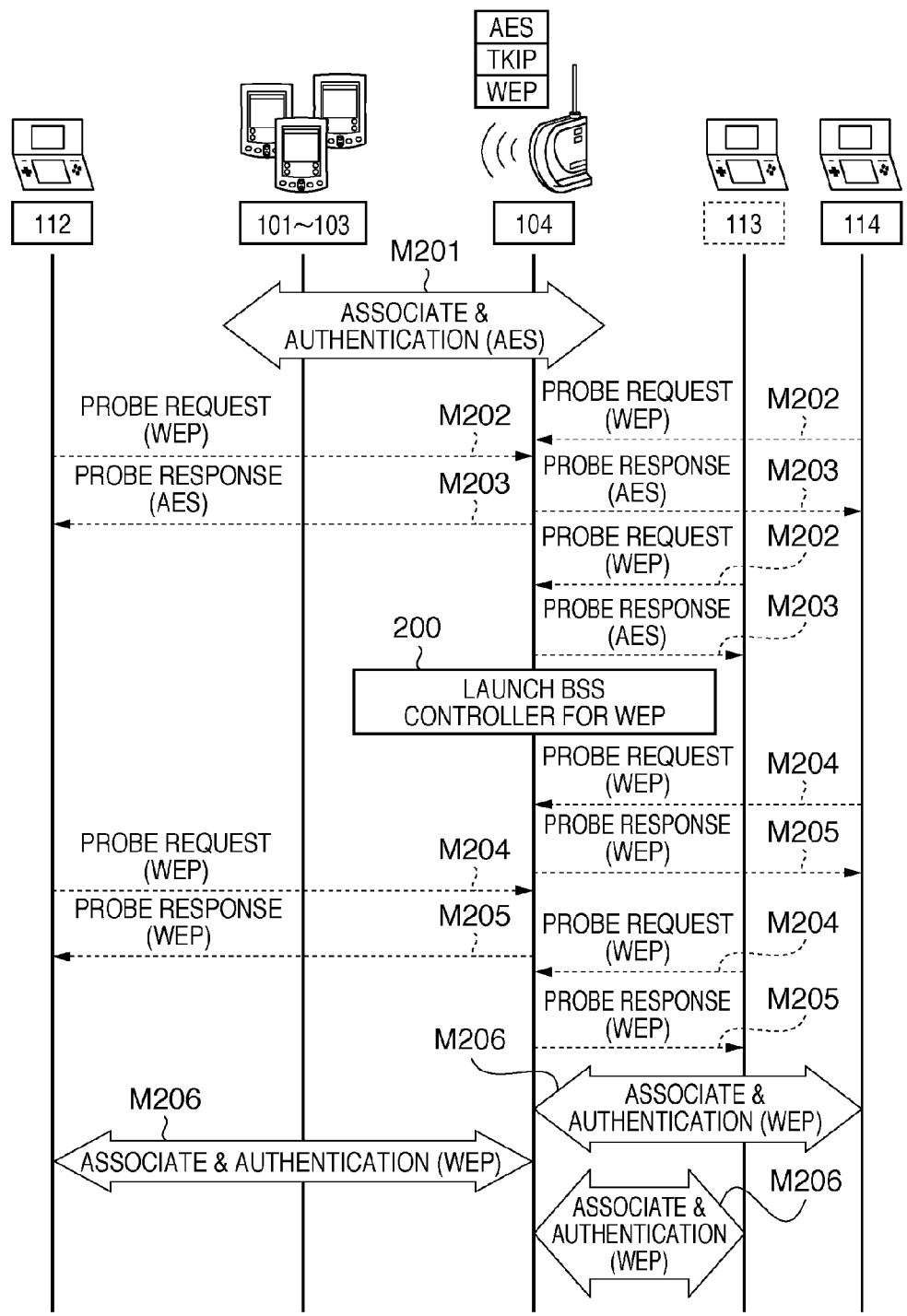
FIG. 2 is a chart showing the sequence of processing until stations 112 to 114 with a low security level are connected to a wireless LAN formed by an access point 104 and stations 101 to 103.

FIG. 2 is a chart showing the sequence of processing until the stations 112 to 114 with a low security level are connected to the wireless LAN formed by the access point 104 according to this embodiment and the stations 101 to 103.

The stations 101 to 103 are being activated, use AES as an encryption method, and are in a state in which associate and authentication processes with respect to the access point 104 are complete (M201).

In this state, assume that the power switches of the stations 112 to 114 are operated, and are activated (or the active stations 112 to 114 move into the wireless area 100).

The stations 112 to 114 transmit probe request messages (M202) including information indicating that WEP is used as an encryption method to the access point 104 so as to request connection to the wireless LAN.

Upon reception of the probe request messages (M202), the access point 104 transmits probe response messages (M203) including information indicating the encryption method (AES) used in the wireless LAN formed between itself and the stations 101 to 103.

The stations 112 to 114 receive the probe response messages (M203) transmitted from the access point 104, and confirm the information indicating the encryption method (AES) included in the probe response messages (M203).

As a result of confirmation, when it is determined that the encryption method (WEP) of the stations 112 to 114 is different from that (AES) indicated by the information included in the probe response messages, the stations 112 to 114 re-transmit probe request messages (M204). With these messages, the stations 112 to 114 search for another access point with an equal security level.

In this case, the access point 104 newly launches a controller (BSS controller for WEP) which makes wireless communications with stations by that encryption method (WEP) so as to cope with the information indicating the encryption method (WEP) included in the probe request messages (200).

The BSS controller for WEP (second controller) transmits probe response messages (M205) including information indicating that WEP (second encryption method) is used as an encryption method. As a result, the encryption method (WEP) of the stations 112 to 114 matches that (WEP) indicated by the information included in the probe response messages (M205).

As a result of confirmation of the probe response messages (M205), when it is determined that the two encryption methods match, the stations 112 to 114 launch associate processing with respect to the access point 104 (M206).

With the aforementioned processing, the stations 112 to 114 can establish connection to the wireless LAN formed by the access point 104.

<3. Configuration of Wireless LAN After Stations With Low Security Level are Connected>

Figure 3:
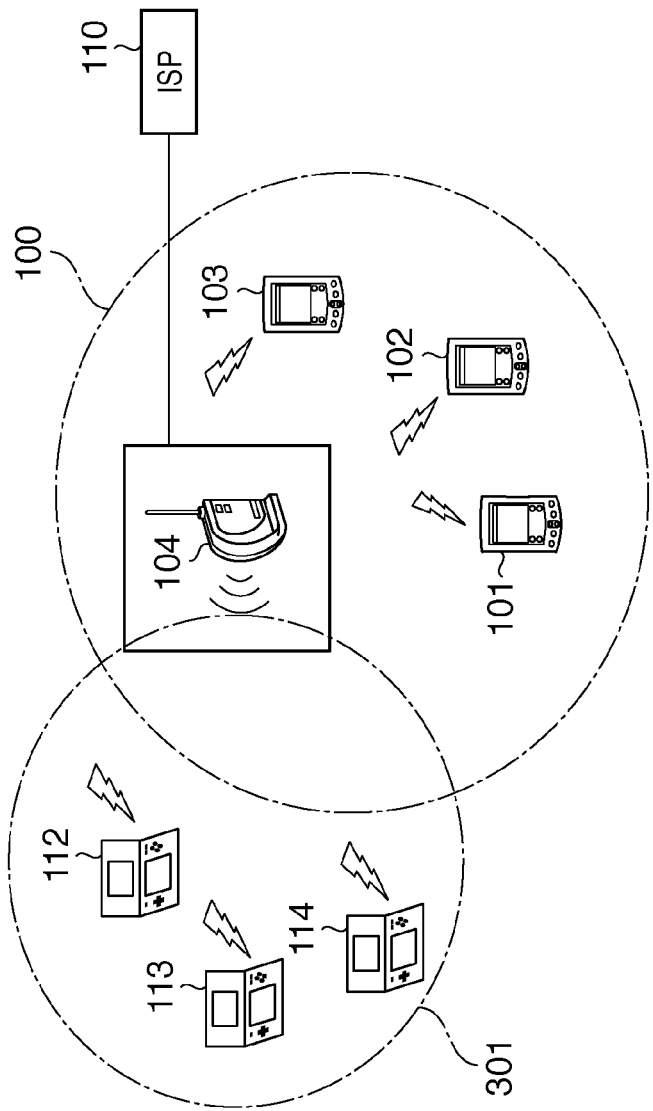
FIG. 3 is a view showing the configuration after the stations 112 to 114 with a low security level are connected to the wireless LAN formed by the access point 104.

FIG. 3 is a view showing the configuration after the stations 112 to 114 with a low security level are connected to the wireless LAN formed by the access point 104. Referring to FIG. 3, reference numeral 301 denotes a wireless area of a wireless LAN which uses WEP as an encryption method.

As shown in FIG. 3, the access point 104 according to this embodiment forms different wireless LANs (the first network 100 and second network 301) for respective station groups with different security levels. As a result, even when stations with different security levels exist together, wireless communications can be made without lowering the overall security level.

<4. Details of Processing in Access Point>

Details of the processing in the access point 104 upon implementing the connection processing shown in FIG. 2 will be described below.

Figure 4:
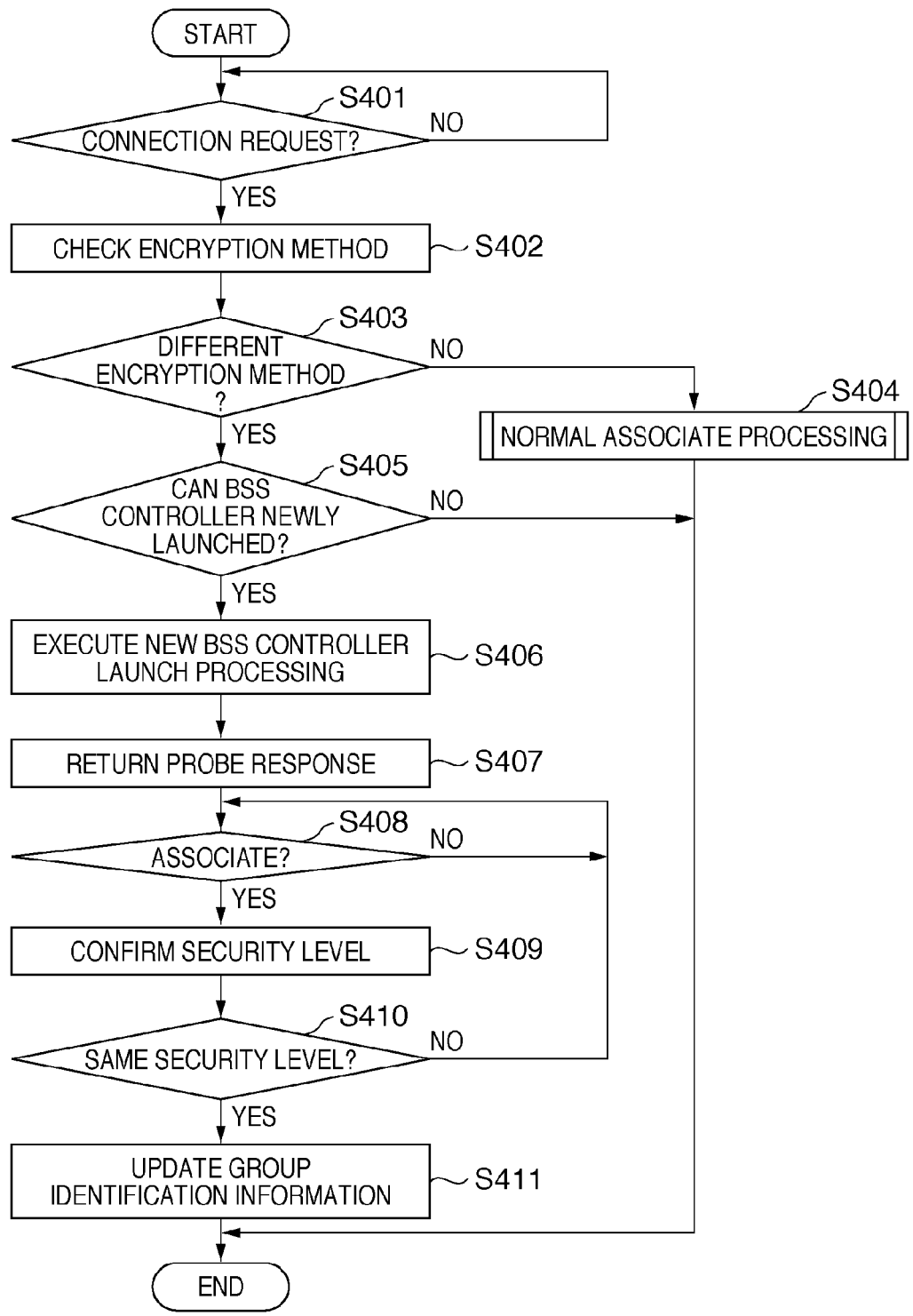
FIG. 4 is a flowchart showing, in detail, the sequence of processing in the access point 104 when the stations 112 to 114 are connected to the wireless LAN.

FIG. 4 is a flowchart showing, in detail, the sequence of processing in the access point 104 when the stations 112 to 114 are connected to the wireless LAN.

The access point 104 confirms in step S401 if probe request messages (M202) are received from the stations 112 to 114.

If it is determined in step S401 that the probe request messages (M202) are received from the stations 112 to 114, the process advances to step S402 to confirm information indicating an encryption method included in the probe request messages. As a result, the access point 104 can confirm the encryption method that can be used by the stations 112 to 114.

The access point 104 confirms in step S403 if the encryption method confirmed in step S402 matches that used in the wireless LAN formed by itself.

As a result of confirmation, if it is determined that the two encryption methods match (i.e., if it is determined that information indicating that AES is used as an encryption method is included in the probe request messages (M202)), the process advances to step S404 to execute normal associate processing.

On the other hand, as a result of confirmation, if it is determined that the two encryption methods do not match, the access point 104 executes the following processes for the stations 112 to 114.

That is, the access point 104 checks in step S405 if a BSS using the encryption method that can be used by the stations 112 to 114 can be formed in addition to the existing BSS using AES as the encryption method. In this case, the access point 104 checks if a BSS controller for generating a BSS using the encryption method that can be used by the stations 112 to 114 is launched to generate a new BSS.

If it is determined in step S405 that a BSS using the encryption method that can be used by the stations 112 to 114 cannot be generated, and a new BSS controller is not launched, the processing ends.

On the other hand, if it is determined in step S405 that a new BSS controller is launched to generate a BSS using the encryption method that can be used by the stations 112 to 114, the process advances to step S406. In step S406, the access point 104 launches the BSS controller for WEP so as to form a new wireless LAN using WEP as the encryption method. The BSS controller for WEP uses an encryption method, ESSID (group identification information: network identification information), and use channel (frequency channel) different from those of the BSS controller for AES so as to form a wireless LAN different from the BSS controller for AES.

In step S407, the access point 104 returns probe response messages (M205) including information indicating that it can also use the encryption method (WEP) that can be used by the stations 112 to 114.

Upon reception of the probe response messages (M205), the stations 112 to 114 start associate processing (M206) to the new BSS controller using WEP as the encryption method. For this reason, the access point 104 checks in step S408 if associate requests are received. If it is determined in step S408 that the associate requests are received, the process advances to step S409.

In step S409, the access point 104 confirms the encryption method (security level) used in wireless communications with the stations 112 to 114.

As a result of confirmation, if it is determined that the security level with the stations 112 to 114 is equal, the process advances from step S410 to step S411 to store group identification information in association with the stations with which wireless communications can be made at the same security level.

<5. Details of Processing in Stations>

Details of the processing in the stations 112 to 114 upon implementation of the connection processing shown in FIG. 2 will be described below.

Figure 5:
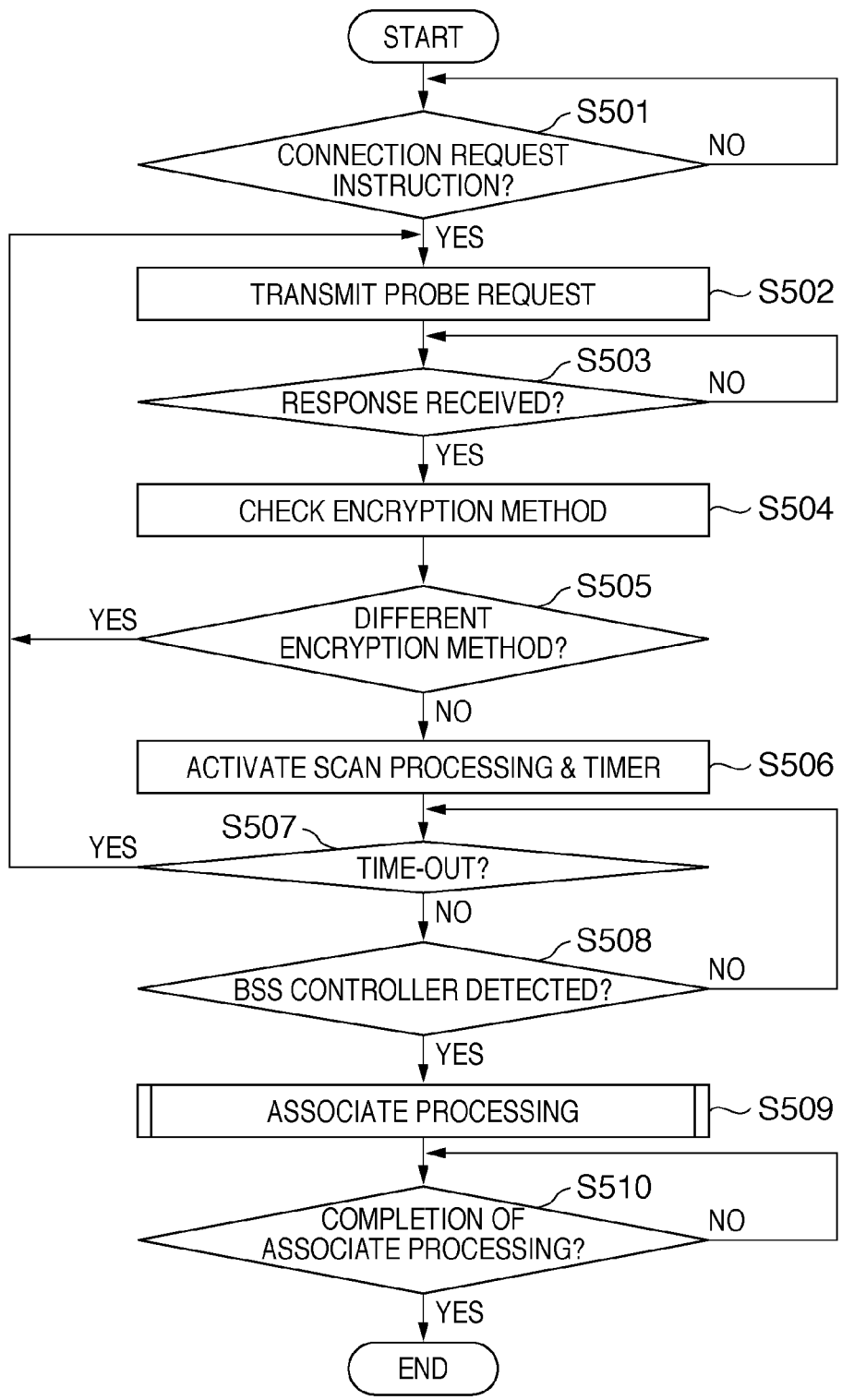
FIG. 5 is a flowchart showing the sequence of connection processing to the wireless LAN in the stations 112 to 114.

FIG. 5 is a flowchart showing the sequence of connection processing to the wireless LAN in the stations 112 to 114.

After each of the stations 112 to 114 (to be also referred to as a WEP station hereinafter) is activated by a power switch operation, the WEP station checks in step S501 if an instruction to issue a connection request is input. If it is determined that the instruction to issue a connection request is input, the process advances to step S502.

In step S502, the WEP station transmits a probe request message (M202) including information indicating that WEP is used as an encryption method to the access point 104 so as to request connection to the wireless LAN.

The WEP station confirms in step S503 if a probe response message (M203) is received from the access point 104. If it is determined that the probe response message (M203) is received, the process advances to step S504.

In step S504, the WEP station confirms information indicating an encryption method included in the probe response message (M203). As a result of confirmation in step S504, if it is determined that the encryption method indicated by the information included in the probe response message (M203) is different from that which can be used by the stations 112 to 114, the process returns to step S502. In this case, the WEP station re-transmits a probe request message (M204) so as to search for another access point with an equal security level.

On the other hand, as a result of confirmation in step S504, if it is determined that the two encryption methods match, each of the stations 112 to 114 executes the following processes.

That is, in step S506 the WEP station searches for a BSS controller (which uses an encryption method that matches the encryption method that can be used by the stations 112 to 114) launched in the access point 104. More specifically, the WEP station activates a search timer and starts scan processing.

The WEP station repeats steps S507 and S508 until a search for the new BSS controller launched in the access point 104 has succeeded in step S507.

At this time, if the search timer has reached a time-out (YES in step S507), the process returns to step S502 to re-transmit a probe request message (M204) so as to search for a BSS controller with an equal security level.

On the other hand, if the new BSS controller using WEP as the encryption method is found before the time-out of the search timer (YES in step S508), the process advances to step S509 to launch associate processing with respect to the access point 104.

The WEP station confirms in step S510 if the associate processing (M206) with the access point 104 is complete. If it is determined that the associate processing is complete, the connection processing ends.

<6. Wireless Communication in Wireless LAN After Connection Processing>

Figure 6:
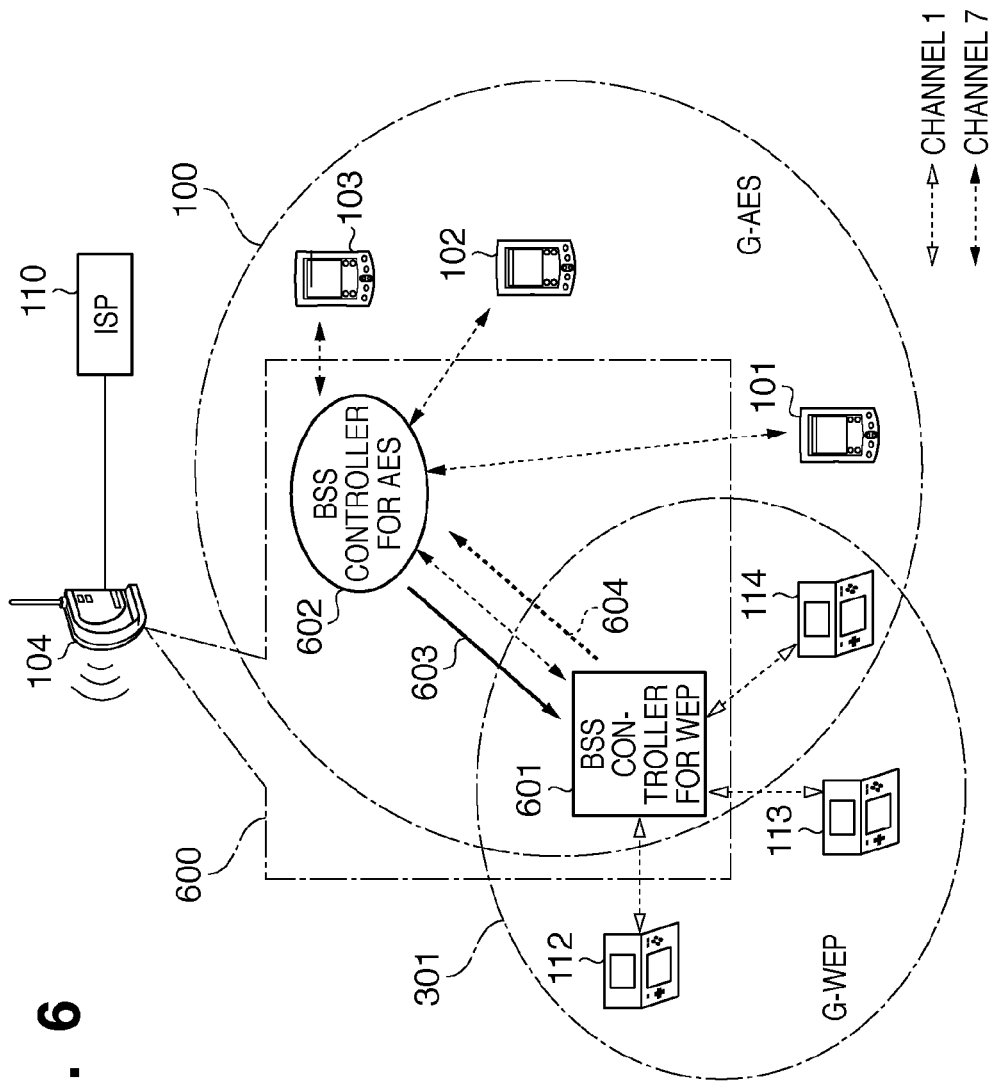
FIG. 6 is a view for explaining wireless communications in the wireless LANs (those after the stations 112 to 114 are connected) formed by the access point 104.

FIG. 6 is a view for explaining wireless communications in the wireless LANs formed by the access point 104 according to this embodiment (those after the stations 112 to 114 are connected). That is, FIG. 6 is a view for explaining data transmission in a state in which the plurality of BSS controllers which make wireless communications with the stations with different security levels are launched.

Referring to FIG. 6, reference numeral 600 denotes a controller which includes BSS controllers. Reference numeral 601 denotes a BSS controller for WEP which uses WEP as an encryption method of those of the controller 600 in the access point 104. Reference numeral 602 denotes a BSS controller for AES which uses AES as an encryption method.

Reference numeral 603 denotes transmission data transmitted from the BSS controller 602 for AES to the BSS controller 601 for WEP. Reference numeral 604 denotes transmission data transmitted from the BSS controller 601 for WEP to the BSS controller 602 for AES.

In FIG. 6, the stations 112 to 114 make wireless communications under the control of the BSS controller 601 for WEP in the wireless area 301 formed by the BSS controller 601 for WEP which uses WEP as the encryption method.

Likewise, the stations 101 to 103 make wireless communications under the control of the BSS controller 602 for AES in the wireless area 100 formed by the BSS controller 602 for AES which uses AES as the encryption method.

As for the transmission data 603 which is transmitted from the BSS controller 602 for AES to the BSS controller 601 for WEP, the BSS controller 601 for WEP stores the addresses of the stations 101 to 103 as the transmission sources.

The BSS controller 601 for WEP transmits only transmission data to the stored addresses of the stations 101 to 103 as the transmission sources to the BSS controller 602 for AES. That is, transmission of transmission data from the BSS controller with a low security level to that with a high security level is limited to that of response data.

As can be seen from the above description, using the access point according to this embodiment, even when a station with a low security level issues a connection request, wireless LANs can be separated in correspondence with stations with different security levels.

Since transmission data between different security levels is relayed inside the access point, the transmission data can be limited. As a result, the following effects can be received.

(1) A wireless LAN with a high security level and that with a low security level can exist together.

(2) Respective security levels can be held.

(3) A station with a low security level (e.g., WEP) can use services of a wireless LAN with a high security level.

[Second Embodiment]

In the first embodiment, when a station with a different security level issues a connection request, that connection request is coped with in such a manner that the access point launches a new BSS controller (i.e., to activate BSS controllers of two different types).

However, the present invention is not limited to this. For example, the above connection request may be coped with in such a manner that a station having a function as an access point of those which have already been connected to an access point launches a BSS controller for WEP. Details of this embodiment will be described below.

<1. Configuration of Wireless LAN Before Connection of Stations With Low Security Level>

Figure 7:
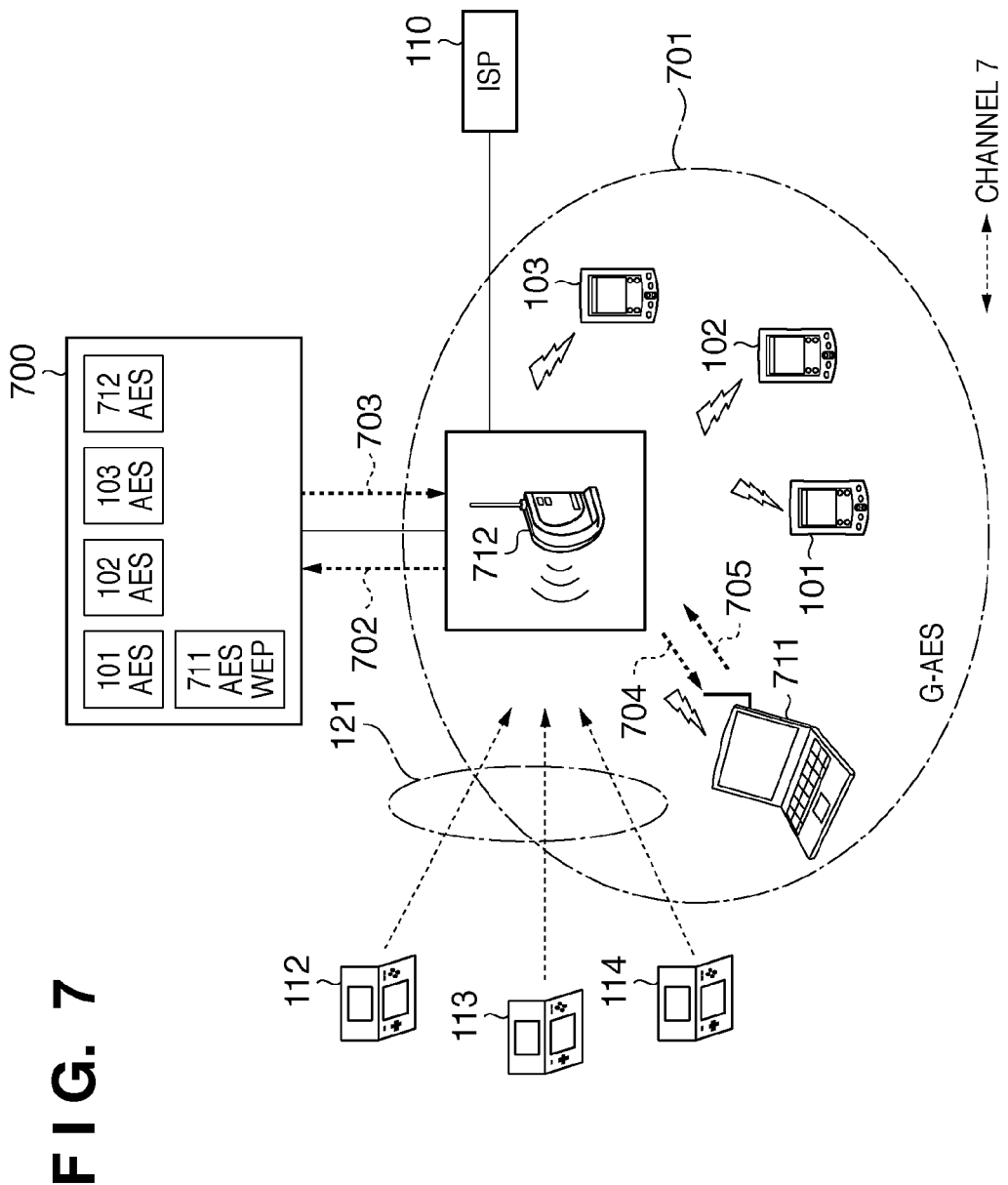
FIG. 7 is a view showing the configuration of a wireless LAN which comprises an access point according to the second embodiment of the present invention.

FIG. 7 is a view showing the configuration of a wireless LAN including an access point according to the second embodiment of the present invention.

Referring to FIG. 7, reference numeral 701 denotes a wireless area of a wireless LAN formed by a communication apparatus using AES as an encryption method; and 101 to 103, stations as second communication apparatuses, which are associating with the wireless area 701. Reference numeral 711 denotes a display apparatus as a third communication apparatus, which is associating with the wireless area 701. The display apparatus 711 has both functions of a station mode and access point mode.

Reference numeral 712 denotes an access point that controls the stations 101 to 103 and display apparatus 711, which are associating with the wireless area 701. A BSS controller for AES of the access point 712 controls the stations 101 to 103 which are associating with the wireless area 701.

Reference numeral 110 denotes an ISP to which the access point 712 is connected.

Reference numeral 700 denotes a network control apparatus, which stores information associated with an encryption method that can be used by the stations 101 to 103, display apparatus 711, and access point 712, which have already been connected to the wireless area 701.

Reference numeral 702 denotes transmission data transmitted from the access point 712 to the network control apparatus 700. Reference numeral 703 denotes transmission data transmitted from the network control apparatus 700 to the access point 712.

Reference numeral 704 denotes transmission data transmitted from the access point 712 to the display apparatus 711. Reference numeral 705 denotes transmission data transmitted from the display apparatus 711 to the access point 712.

Reference numerals 112 to 114 denote stations as communication apparatuses which can use only WEP as an encryption method (stations which have a usable security level lower than the stations 101 to 103), and are not connected to the wireless LAN in FIG. 7.

Reference numeral 121 denotes probe request messages transmitted from the stations 112 to 114 so as to connect to the wireless LAN.

<2. Sequence of Overall Processing Until Stations With Low Security Level are Connected to Wireless LAN>

Figure 8:
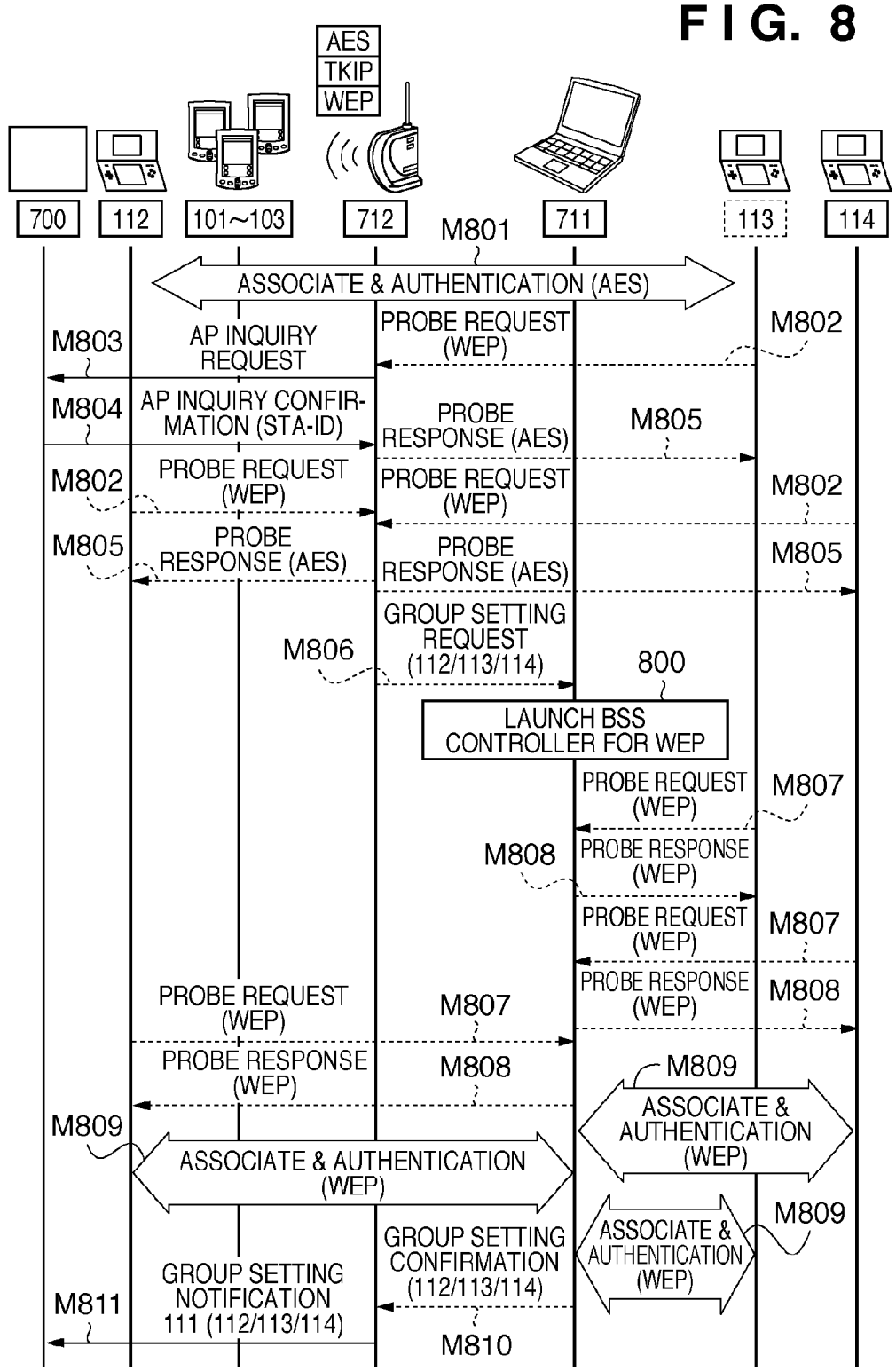
FIG. 8 is a chart showing the sequence of processing until stations 112 to 114 with a low security level are connected to the wireless LAN formed by an access point 712, stations 101 to 103, and display apparatus 711.

FIG. 8 is a chart showing the sequence of processing until the stations 112 to 114 with a low security level are connected to the wireless LAN formed by the access point 712 according to this embodiment, stations 101 to 103, and display apparatus 711.

As described above, the stations 101 to 103 and display apparatus 711 use AES as an encryption method, and are in a state in which associate and authentication processes with respect to the access point 712 are complete (M801).

In this state, assume that the power switches of the stations 112 to 114 are operated, and are activated (or the active stations 112 to 114 move into the wireless area 701).

The stations 112 to 114 transmit probe request messages (M802) including information indicating that WEP is used as an encryption method to the access point 712 so as to request connection to the wireless LAN.

Upon reception of the probe request messages (M802), the access point 712 transmits an AP inquiry request message (M803) to the network control apparatus 700. The AP inquiry request message (M803) is a message that inquires about the presence/absence of a communication apparatus, which has an access point function and can use WEP as an encryption method, of those which are associating with the access point 712.

Upon reception of the AP inquiry request message (M803), the network control apparatus 700 searches stored information, and transmits a search result to the access point 712 as an AP inquiry confirmation message (M804).

Also, the access point 712 transmits probe response messages (M805) as responses to the probe request messages (M802). The probe response message (M805) includes information indicating an encryption method (AES) used in the wireless LAN formed with the stations 101 to 103 and display apparatus 711.

The stations 112 to 114 receive the probe response messages (M805) transmitted from the access point 712, and confirm the information indicating the encryption method (AES) included in the probe response messages (M805).

As a result of confirmation, when it is determined that the encryption method (WEP) of the stations 112 to 114 is different from that (AES) indicated by the information included in the probe response messages, the stations 112 to 114 re-transmit probe request messages (M807). With these messages, the stations 112 to 114 search for another access point with an equal security level.

Upon reception of the AP inquiry confirmation message (M804), the access point 712 recognizes the presence/absence of a communication apparatus which serves as an access point, and can use the encryption method (WEP) of the stations 112 to 114.

In this embodiment, assume that the access point 712 recognizes the display apparatus 711 as a communication apparatus which serves as an access point, and can use the encryption method (WEP) of the stations 112 to 114. In this case, the access point 712 transmits a group setting request message (M806) to the display apparatus 711. This group setting request message is a message which requests the display apparatus 711 to be activated as an access point, to form a new wireless LAN using the designated encryption method, and to form a new group. Note that the group setting request message may designate a communication apparatus that forms a group, group identification information, and a frequency channel to be used. Upon reception of the group setting request message (M806), the display apparatus 711 launches a BSS controller for WEP so as to form a wireless LAN using the encryption method (WEP) designated by the message (800).

The BSS controller for WEP in the display apparatus 711 transmits probe response messages (M808) including information indicating that WEP is used as an encryption method. As a result, the encryption method of the stations 112 to 114 matches that indicated by the information included in the probe response messages (M808).

As a result of confirmation of the probe response messages (M808), when it is determined that the two encryption methods match, the stations 112 to 114 launch associate processing (M809) with respect to the BSS controller for WEP in the display apparatus 711.

With the above processing, the stations 112 to 114 can establish connection to the wireless LAN formed by the display apparatus 711.

Upon completion of the associate processing, the display apparatus 711 transmits a group setting confirmation message (M810) to the access point 712 so as to notify the access point 712 of formation of a new group. Upon reception of the group setting confirmation message (M810), the access point 712 transmits a group setting notification message (M811) to the network control apparatus 700. Upon reception of the group setting notification message (M811), the network control apparatus 700 stores that message.

<3. Configuration of Wireless LAN After Stations With Low Security Level are Connected>

Figure 9:
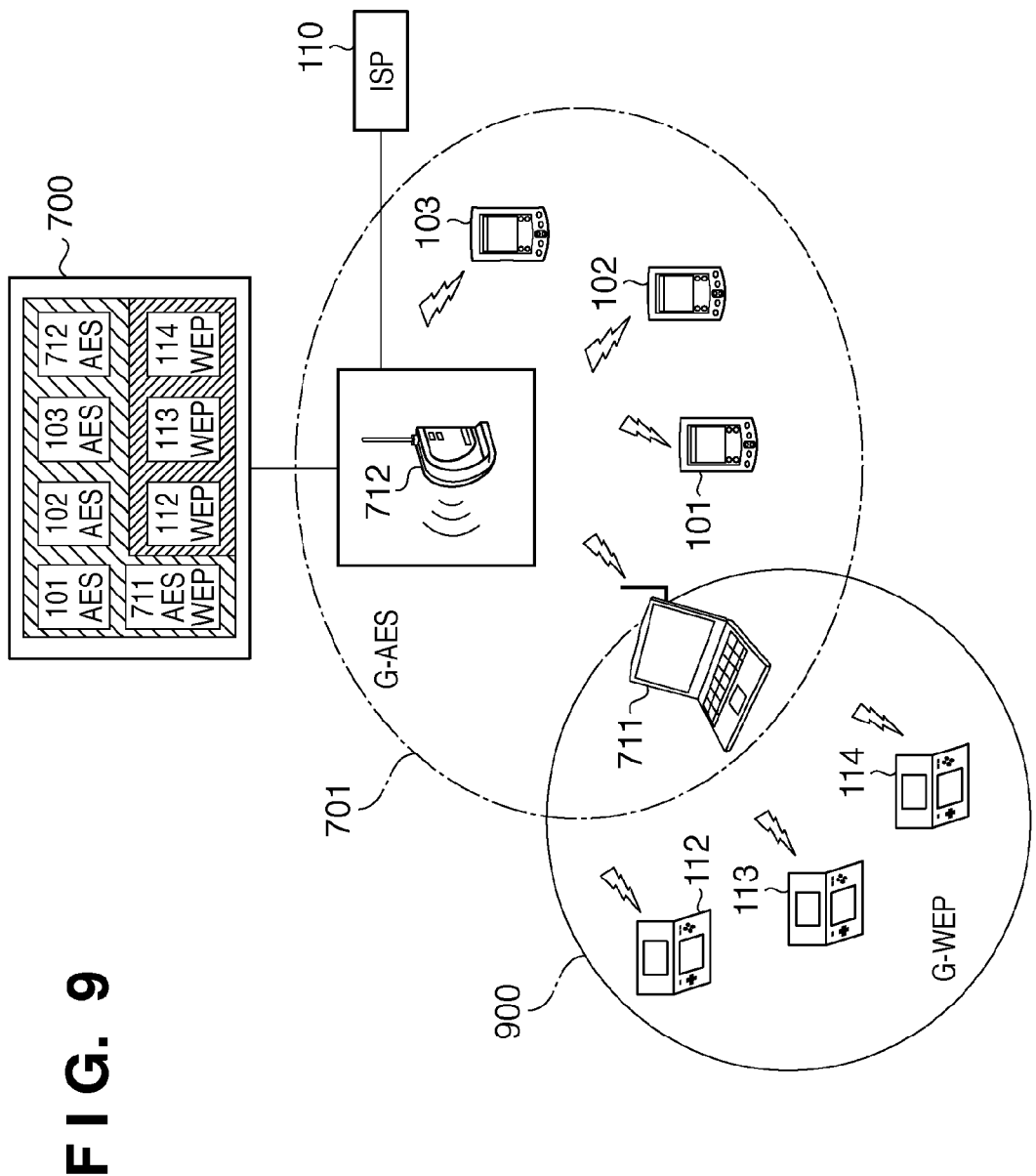
FIG. 9 is a view showing the configuration of the wireless LAN after the stations 112 to 114 with a low security level are connected.

FIG. 9 is a view showing the configuration of the wireless LAN after the stations 112 to 114 with a low security level are connected. As shown in FIG. 9, the stations 101 to 103 are connected to a first network generated by the access point 712, and the stations 112 to 114 are connected to a second network generated by the display apparatus 711.

The network control apparatus 700 stores information associated with the stations 112 to 114 using WEP in addition to information associated with the stations 101 to 103 using AES as the encryption method.

<4. Details of Processing in Access Point>

Details of processing in the access point 712 upon implementation of the connection processing shown in FIG. 8 will be described below.

Figure 10:
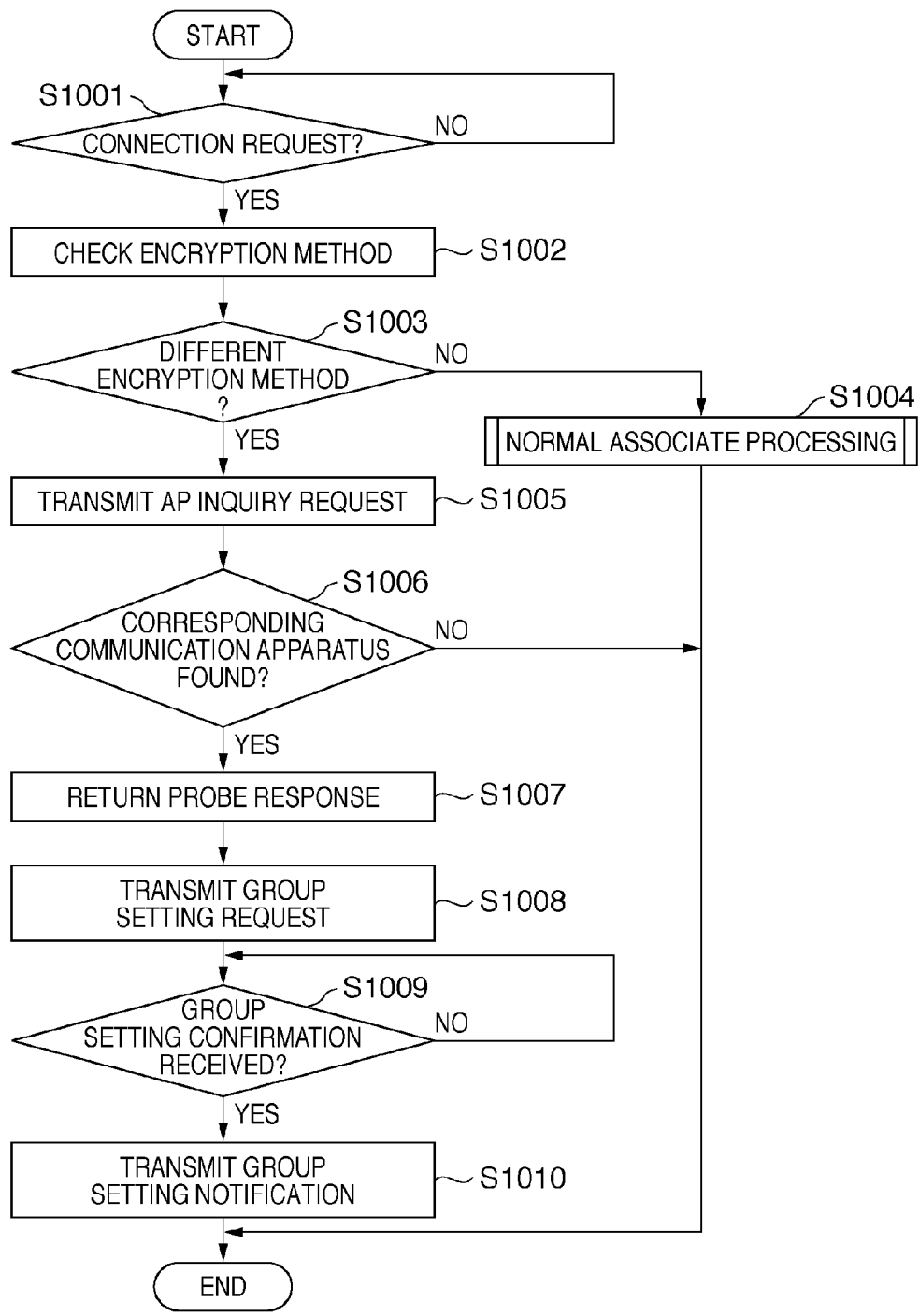
FIG. 10 is a flowchart showing, in detail, the sequence of connection processing in the access point 712.

FIG. 10 is a flowchart showing, in detail, the sequence of the connection processing in the access point 712.

The access point 712 confirms in step S1001 if probe request messages (M802) are received from the stations 112 to 114.

If it is determined in step S1001 that the probe request messages (M802) are received from the stations 112 to 114, the process advances to step S1002 to confirm information indicating an encryption method included in the probe request messages. As a result, the access point 712 can confirm the encryption method that can be used by the stations 112 to 114.

The access point 712 confirms in step S1003 if the encryption method confirmed in step S1002 matches that used in the wireless LAN formed by itself.

As a result of confirmation, if it is determined that the two encryption methods match (i.e., if it is determined that information indicating that AES is used as an encryption method is included in the probe request messages (M802)), the process advances to step S1004 to execute normal associate processing.

On the other hand, as a result of confirmation, if it is determined that the two encryption methods do not match, the access point 712 executes processing for specifying a communication apparatus which has an access point function, and uses the encryption method indicated by the information included in the probe request messages from those which exist in the wireless area 701.

More specifically, in step S1005 the access point 712 transmits an AP inquiry request message (M803) to the network control apparatus 700. Furthermore, in step S1006 the access point 712 enters an AP inquiry confirmation message (M804) waiting state.

Upon reception of the AP inquiry confirmation message (M804) from the network control apparatus 700, the access point 712 analyzes that message in step S1006 to check if the corresponding communication apparatus exists. If it is determined in step S1006 that no corresponding communication apparatus exists, the processing ends.

On the other hand, if it is determined in step S1006 that the corresponding communication apparatus exists, the access point 712 executes the following processes for the stations 112 to 114. Assume that the display apparatus 711 is the corresponding communication apparatus in this case.

In step S1007, the access point 712 returns probe response messages (M805) to the stations 112 to 114 which issued the connection requests. Note that the probe response message (M805) returned from the access point 712 includes information indicating that AES is used as an encryption method.

In step S1008, the access point 712 transmits a group setting request message (M806) including group identification information of the stations 112 to 114 to the display apparatus 711. In response to this message, the display apparatus 711 launches the BSS controller for WEP.

In step S1009, the access point 712 enters a group setting confirmation message (M810) waiting state from the display apparatus 711.

Upon reception of a group setting confirmation message (M810) from the display apparatus 711 in the group setting confirmation message (M810) waiting state, the process advances from step S1009 to step S1010.

In step S1010, the access point 712 analyzes the group setting confirmation message (M810). Then, the access point 712 transmits, to the network control apparatus 700, a group setting notification message (M811) including group identification information used to identify the display apparatus 711 and stations 112 to 114 which form the new wireless area 900, and a group formed by these apparatuses.

<5. Details of Processing in Display Apparatus>

Details of processing in the display apparatus 711 upon implementation of the connection processing shown in FIG. 8 will be described below.

Figure 11:
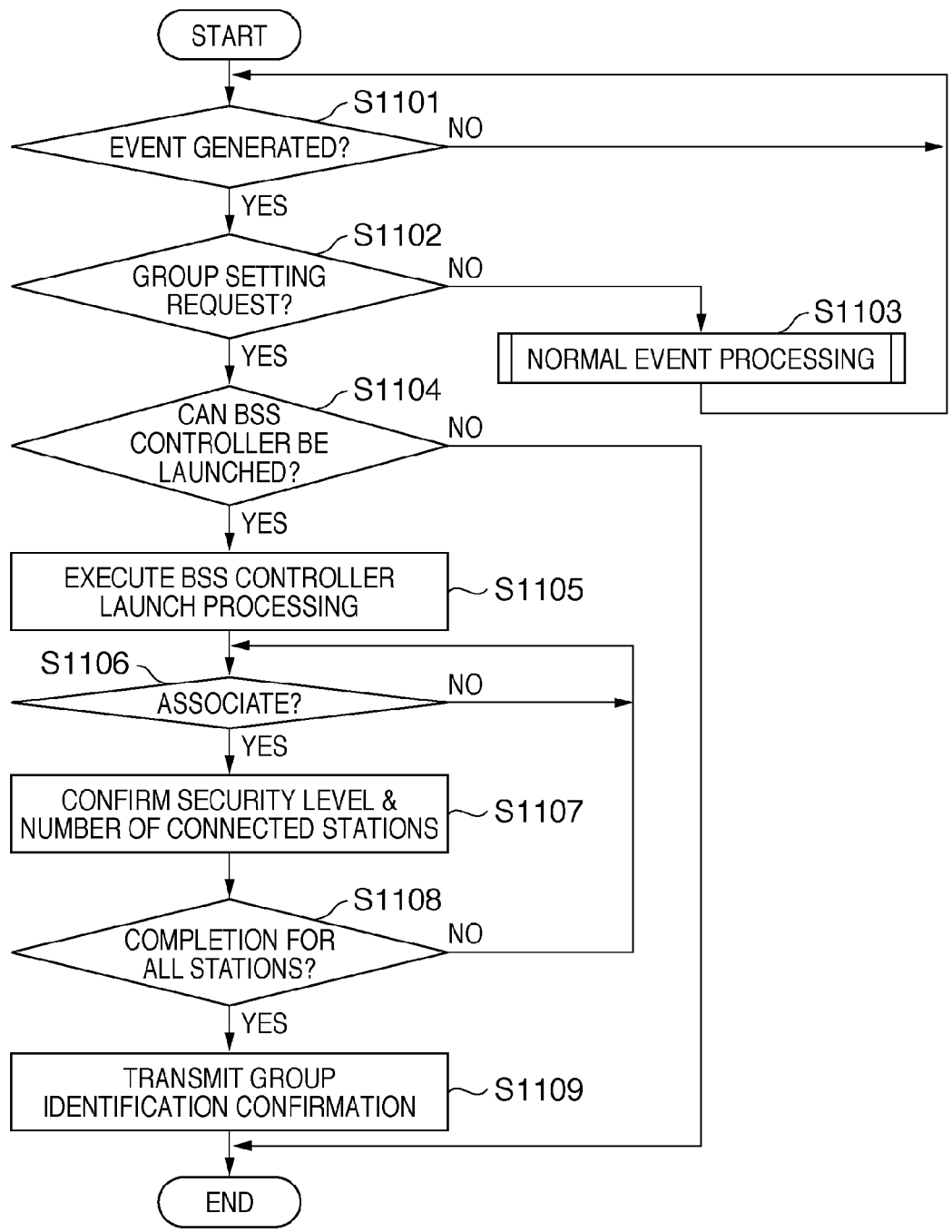
FIG. 11 is a flowchart showing the sequence of processing in the display apparatus 711.

FIG. 11 is a flowchart showing the sequence of processing in the display apparatus 711.

Assume that the display apparatus 711 is in a state in which the associate and authentication processes are complete with respect to the access point 712 (M801).

The display apparatus 711 checks in step S1101 if an event is received from the access point 712. If it is determined in step S1101 that an event is received, the process advances to step S1102 to check if that event is a group setting request message (M806).

If it is determined in step S1102 that the event is not a group setting request message (M806), the process advances to step S1103 to execute processing according to the received event.

On the other hand, if it is determined in step S1102 that the event is a group setting request message (M806), the process advances to step S1104.

The display apparatus 711 checks in step S1104 if a BSS controller is launched, and a wireless LAN (BSS) using the encryption method designated by the request can be generated. In this case, the display apparatus 711 checks if a BSS controller which uses the encryption method (WEP) that can be used by the stations 112 to 114 is launched, and a wireless LAN can be generated. If it is determined in step S1104 that a BSS controller (BSS controller for WEP) that uses the encryption method (WEP) is not launched, the processing ends.

On the other hand, if it is determined in step S1104 that a BSS controller (BSS controller for WEP) is launched to generate a BSS using the encryption method (WEP), the process advances to step S1105. In step S1105, the display apparatus 711 launches a controller for WEP so as to form a new wireless LAN using WEP as the encryption method. The controller for WEP generates a BSS using the encryption method designated by the group setting request message. When the group setting request message also designates an ESSID (group identification information: network identification information) and a use channel (frequency channel), the controller generates a BSS using the designated ESSID and use channel. In step S1106, the display apparatus 711 executes associate processing (M809) with the stations 112 to 114 after the new BSS controller using WEP as the encryption method is launched.

In step S1107, the display apparatus 711 confirms the encryption method used in wireless communications with the stations 112 to 114 and the number of connected stations. The display apparatus 711 stores information about the stations which have the matched encryption method and an equal security level as an information element of a group setting confirmation message.

The display apparatus 711 executes these processes for all the stations 112 to 114 which issued the connection requests. Upon completion of the processes for all of the stations 112 to 114, the process advances to step S1109, and the display apparatus 711 transmits a group setting confirmation message (M810) to the access point 712.

<6. Details of Processing in Stations>

Details of the processing in the stations 112 to 114 upon implementation of the connection processing shown in FIG. 8 will be described below.

Figure 12:
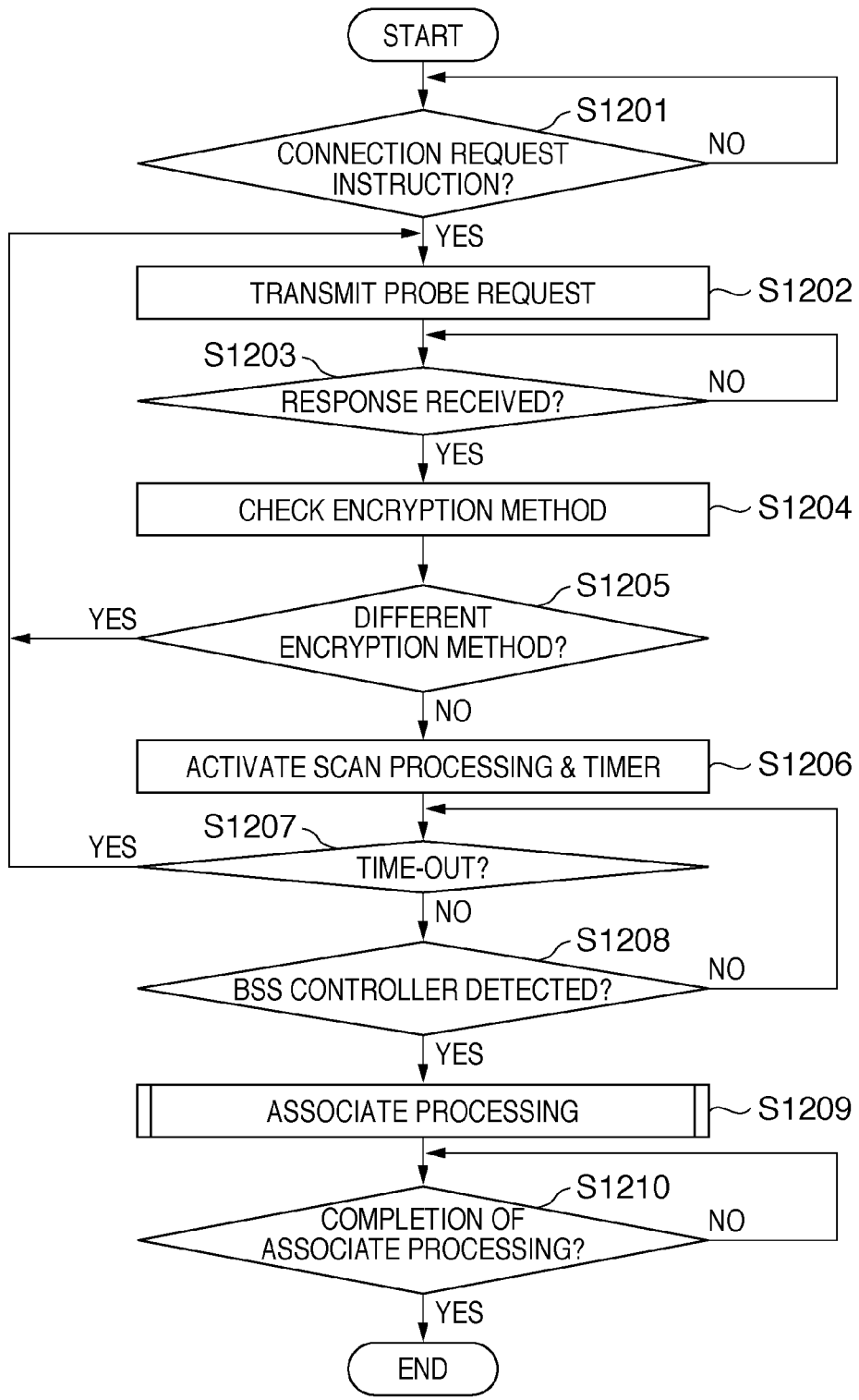
FIG. 12 is a flowchart showing the sequence of connection processing to the wireless LAN in the stations 112 to 114.

FIG. 12 is a flowchart showing the sequence of connection processing to the wireless LAN in the stations 112 to 114.

After each of the stations 112 to 114 (to be also referred to as a WEP station hereinafter) is activated by a power switch operation, the WEP station checks in step S1201 if an instruction to issue a connection request is input. If it is determined that the instruction to issue a connection request is input, the process advances to step S1202.

In step S1202, the WEP station transmits a probe request message (M802) including information indicating that WEP is used as an encryption method to the access point 712 so as to request connection to the wireless LAN.

The WEP station confirms in step S1203 if a probe response message (M805) is received from the access point 712. If it is determined that the probe response message (M805) is received, the process advances to step S1204.

In step S1204, the WEP station confirms an encryption method included in the probe response message (M805). As a result of confirmation in step S1204, if it is determined that the encryption method included in the probe response message (M805) is different from that which can be used by the stations 112 to 114 (NO in step S1205), the process returns to step S1202. In this case, the WEP station re-transmits a probe request message (M807) so as to search for another access point with an equal security level.

On the other hand, as a result of confirmation in step S1204, if it is determined that the two encryption methods match (YES in step S1205), each of the stations 112 to 114 executes the following processes.

That is, in step S1206 the WEP station searches for a BSS controller (which uses an encryption method that matches the encryption method that can be used by the stations 112 to 114) launched in the display apparatus 711. More specifically, the WEP station activates a search timer and starts scan processing.

The WEP station repeats steps S1207 and S1208 until a search for the new BSS controller launched in the display apparatus 711 has succeeded in step S1207.

At this time, if the search timer has reached a time-out (YES in step S1207), the process returns to step S1202 to re-transmit a probe request message (M807) so as to search for a BSS controller with an equal security level.

On the other hand, if the new BSS controller using WEP as the encryption method is found before the time-out of the search timer (YES in step S1208), the process advances to step S1209. In step S1209, the WEP station launches associate processing with respect to the display apparatus 711.

The WEP station confirms in step S1210 if the associate processing (M809) with the display apparatus 711 is complete. If it is determined that the associate processing is complete, the connection processing ends.

<7. Wireless Communication in Wireless LAN After Connection Processing>

Figure 13:
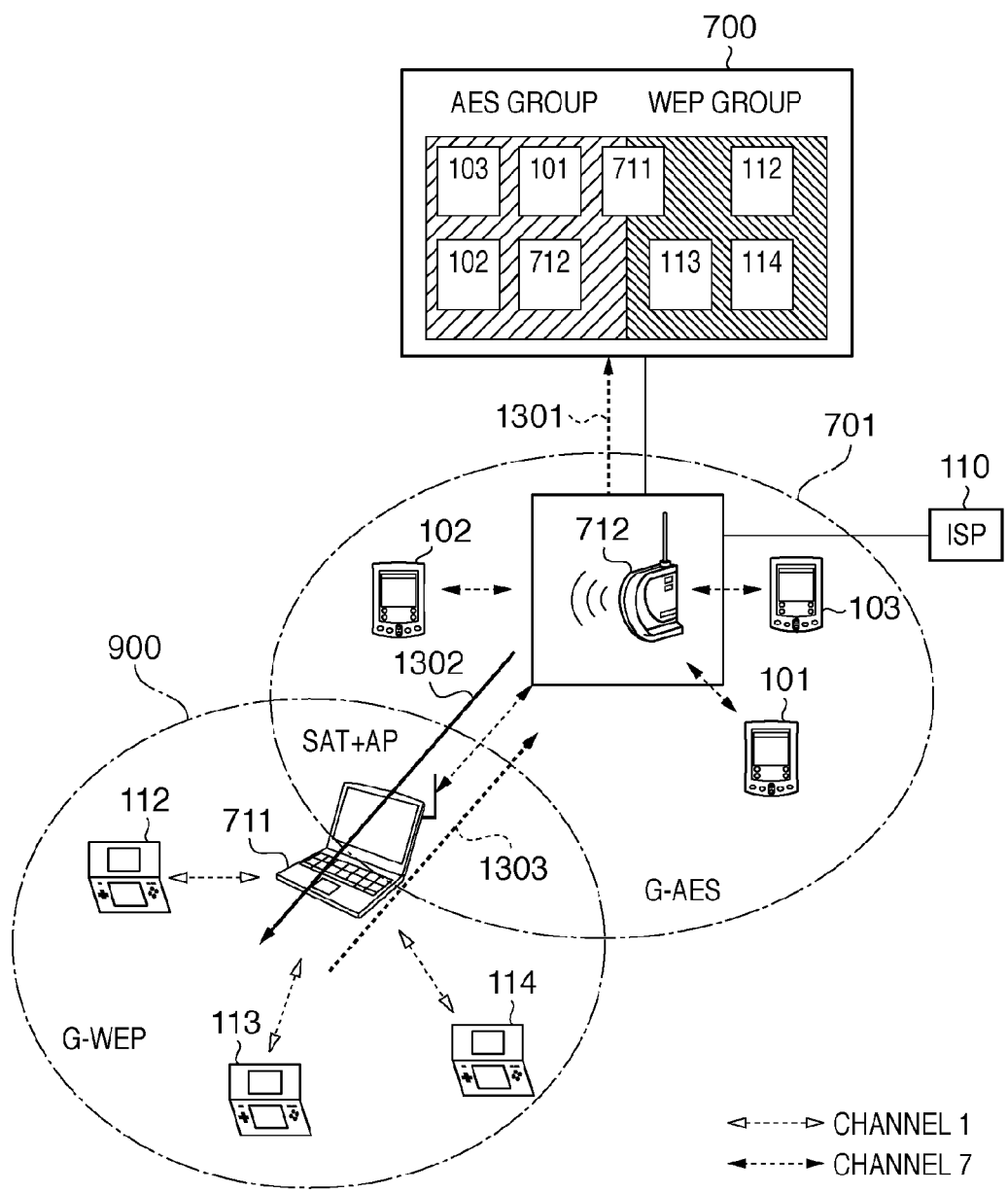
FIG. 13 is a view for explaining wireless communications in the wireless LANs (those after the stations 112 to 114 are connected) formed by the access point 712 and display apparatus 711.

FIG. 13 is a view for explaining wireless communications in the wireless LANs (those after the stations 112 to 114 are connected) formed by the access point 712 and display apparatus 711 according to this embodiment. That is, FIG. 13 is a view for explaining data transmission in a state in which the BSS controller of the display apparatus 711 which makes wireless communications with the stations with a different security level is launched.

In FIG. 13, the stations 101 to 103 are wirelessly connected under the control of the access point 712 in the wireless area 701 using AES as the encryption method. Likewise, the stations 112 to 114 are wirelessly connected under the control of the display apparatus 711 in the wireless area 900 using WEP as the encryption method. Furthermore, the display apparatus 711 is wirelessly connected under the control of the access point 712.

Reference numeral 1301 denotes transmission data transmitted from the access point 712 to the network control apparatus 700. Note that the network control apparatus 700 stores information of security levels associated with communication apparatuses in the wireless areas 701 and 900 while classifying them for respective wireless areas. The information of the display apparatus 711 which belongs to both the wireless areas is stored in both the management areas.

Reference numeral 1302 denotes transmission data transmitted from the access point 712 to the display apparatus 711. Reference numeral 1303 denotes transmission data transmitted from the display apparatus 711 to the access point 712.

As for the transmission data 1302 which is transmitted from the access point 712 to the display apparatus 711, the display apparatus 711 stores the addresses of the stations 101 to 103 as the transmission sources.

The display apparatus 711 transmits, to the access point 712, only transmission data that respond to the transmission source addresses of the stations 101 to 103 stored at the time of reception. That is, transmission of transmission data from the BSS controller with a low security level to that with a high security level is limited to that of response data.

As can be seen from the above description, using the access point according to this embodiment, even when stations with a low security level issue connection requests, wireless LANs can be separated for respective stations with different security levels.

Transmission data between the access point and display apparatus can be limited. As a result, the following effects can be received.

(1) A wireless LAN with a high security level and that with a low security level can exist together.

(2) Respective security levels can be held.

(3) A station with a low security level (e.g., WEP) can use services of a wireless LAN with a high security level.

[Third Embodiment]

The first and second embodiments adopt the configuration in which upon transmission of transmission data between the BSS controller for WEP and that for AES, data other than transmission data that return to the transmission source addresses are limited.

However, the present invention is not limited to such specific configuration. For example, transmission data to be transmitted to addresses that match pre-set addresses or other addresses may be limited.

Alternatively, some pieces of information of upper layers than addresses, for example, TCP/UDP sessions such as IP addresses, port numbers, and the like, may be stored, transmission data other than those which return them may be limited.

[Fourth Embodiment]

In the second embodiment, the network control apparatus 700 manages the security levels associated with communication apparatuses for respective wireless LANs of the wireless areas 701 and 900.

However, the present invention is not limited to this, and a function of managing the security levels associated with communication apparatuses for respective wireless LANs may be implemented by a registrar in WPS.

[Other Embodiments]

Note that the present invention may be applied to either a system including a plurality of apparatuses (for example, a host computer, interface apparatus, reader, printer, and the like) or an apparatus including a single device (for example, a copying machine, facsimile apparatus, and the like).

The objects of the present invention are also achieved when a storage medium that records program codes of software which implements the functions of the aforementioned embodiment is supplied to the system or apparatus. In this case, the aforementioned functions are implemented when a computer (or a CPU or MPU) of that system or apparatus reads out and executes the program codes stored in the storage medium. Note that the storage medium that stores the program codes constitutes the present invention.

As the storage medium used to supply the program codes, for example, a floppy™ disk, hard disk, optical disk, magneto-optical disk, CD-ROM, CD-R, magnetic tape, nonvolatile memory card, ROM, and the like can be used.

The present invention is not limited to a case in which the functions of the aforementioned embodiments are implemented when the computer executes the readout program codes. For example, the present invention also includes a case in which an OS (operating system) or the like, which runs on a computer, executes some or all of actual processes, based on instructions of the program codes, thereby implementing the functions of the aforementioned embodiments.

Furthermore, the present invention also includes a case in which the functions of the aforementioned embodiments are implemented after the program codes read out from the storage medium are written in a memory equipped on a function expansion board or a function expansion unit, which is inserted in or connected to the computer. That is, the present invention also includes a case in which the functions are implemented by some or all of actual processes, which are executed by a CPU or the like equipped on the function expansion board or unit based on the instructions of the program codes after the program codes are written in the memory.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Application No. 2008-001645 filed on Jan. 8, 2008, which is hereby incorporated by reference herein in its entirety.

What is claimed is:

1. A first communication apparatus comprising: a receiver configured to receive a connection request from a second communication apparatus to the first communication apparatus, while the first communication apparatus forms a first network using a first encryption method and; a controller configured to request a third communication apparatus to be activated as a base station to form a second network using a second encryption method designated based on the connection request, when the second encryption method which is requested by the second communication apparatus is different from a first encryption method used.

2. The first apparatus according to claim 1, wherein the controller designates at least one of any of a frequency channel to be used in the second network, another communication apparatus included in the second network, or identification information of the second network.

3. The first apparatus according to claim 1, wherein said controller determines whether or not the second network can be generated, and generates the second wireless in network when said formation unit determines that the second wireless network can be generated.

4. The first apparatus according to claim 1, wherein said controller requests the third communication apparatus to be activated as the based station if security level of the second encryption method is lower than the security level of the first encryption method.

5. The first apparatus according to claim 1, wherein said controller determines the presence/absence of the third communication apparatus which can generate the second wireless network, and requests the third communication apparatus to generate the second wireless network when the third communication apparatus is present.

6. The first apparatus according to claim 1, further comprising a limitation unit configured to limit relaying of data communicated via the first wireless network and data communicated via the second wireless network.

7. A control method in a first communication apparatus, comprising: receiving a connection request from a second communication apparatus to the first communication apparatus, while the first communication apparatus forms a first network using a first encryption method; and requesting a third communication apparatus to be activated as a base station to form a second network using a second encryption method designated based on the connection request, when the second encryption method which is requested by the second communication apparatus is different from a first encryption method.

8. A non-transitory computer-readable storage medium storing a program which causes a computer to execute a control method, the method comprising:
- receiving a connection request from a second communication apparatus to the first communication apparatus, while the first communication apparatus forms a first network using a first encryption method; and
- requesting a third communication apparatus to be activated as a base station to form a second network using a second encryption method designated based on the connection request, when the second encryption method which is requested by the second communication apparatus is different from a first encryption method.

9. The first apparatus according to claim 1,
- wherein the second network uses a second wireless network identification information which is different from a first wireless network identification information used in the first network.

* * * * *